United States Patent
Pedersen

(10) Patent No.: US 9,005,437 B2
(45) Date of Patent: Apr. 14, 2015

(54) APPLIANCES FOR THE ALKALIZING OF WATER

(76) Inventor: Paul Michael Pedersen, Upper Marlboro, MD (US)

( * ) Notice: Subject to any disclaimer, the term of this patent is extended or adjusted under 35 U.S.C. 154(b) by 963 days.

(21) Appl. No.: 12/998,138

(22) PCT Filed: Sep. 29, 2009

(86) PCT No.: PCT/US2009/005352
§ 371 (c)(1),
(2), (4) Date: Apr. 14, 2011

(87) PCT Pub. No.: WO2010/039205
PCT Pub. Date: Apr. 8, 2010

(65) Prior Publication Data
US 2011/0186496 A1    Aug. 4, 2011

Related U.S. Application Data

(60) Provisional application No. 61/194,732, filed on Sep. 30, 2008.

(51) Int. Cl.
*C02F 1/28* (2006.01)
*C02F 1/66* (2006.01)
*C02F 1/68* (2006.01)
*C02F 1/00* (2006.01)

(52) U.S. Cl.
CPC ............. *C02F 1/002* (2013.01); *C02F 1/003* (2013.01); *C02F 1/283* (2013.01); *C02F 1/66* (2013.01); *C02F 1/68* (2013.01); *C02F 2201/006* (2013.01); *C02F 2307/04* (2013.01)

(58) Field of Classification Search
CPC .......... C02F 1/002; C02F 1/003; C02F 1/283; C02F 1/66; C02F 1/68; C02F 1/687; C02F 1/688; C02F 2307/04; C02F 2201/006
USPC ......................... 210/206, 241, 282
See application file for complete search history.

(56) References Cited

U.S. PATENT DOCUMENTS

| | | | | |
|---|---|---|---|---|
| 4,659,463 A | * | 4/1987 | Chandler et al. | 210/202 |
| 5,928,506 A | * | 7/1999 | Bae | 210/94 |
| 2008/0105618 A1 | * | 5/2008 | Beckius et al. | 210/650 |

* cited by examiner

*Primary Examiner* — Lucas Stelling
(74) *Attorney, Agent, or Firm* — Michael McGreal

(57) ABSTRACT

The invention is directed to point of use devices and appliances for alkalizing water that is to be ingested. The devices comprise straws, carafes, countertop units, water bottle units, and any other devices that will treat the water at the point of use. The water will flow through the point of use devices or appliances longitudinally or radially. The point of use device or appliance will contain an alkalizing formulation that will increase the pH of the water to preferably above about 8. The amount of water that can be treated will depend on the amount of alkalizing formulation used and the size and capacity of the device or appliance for the alkalizing formulation. The alkalizing formulation will supply to the water being treated one or more of potassium, calcium, and magnesium ions. The water prior to contacting the treatment compound can be filtered through a purification formulation to remove particulates, heavy metals, and various organic compounds. The purification formulation can be a form of activated carbon.

20 Claims, 3 Drawing Sheets

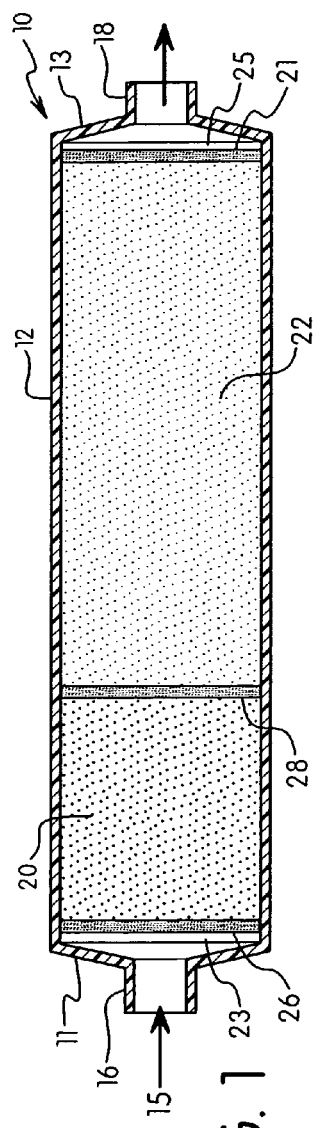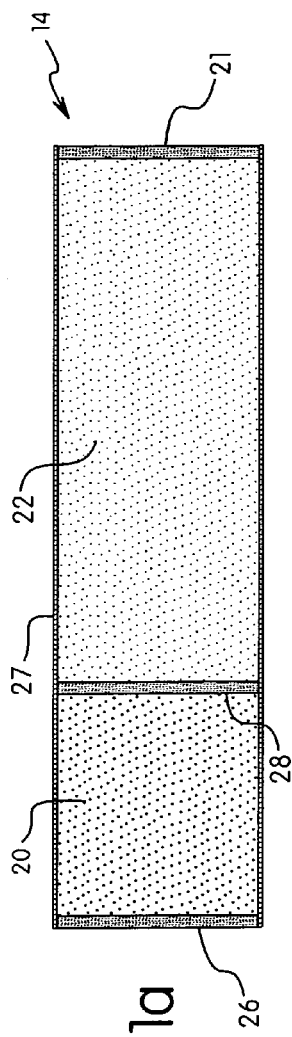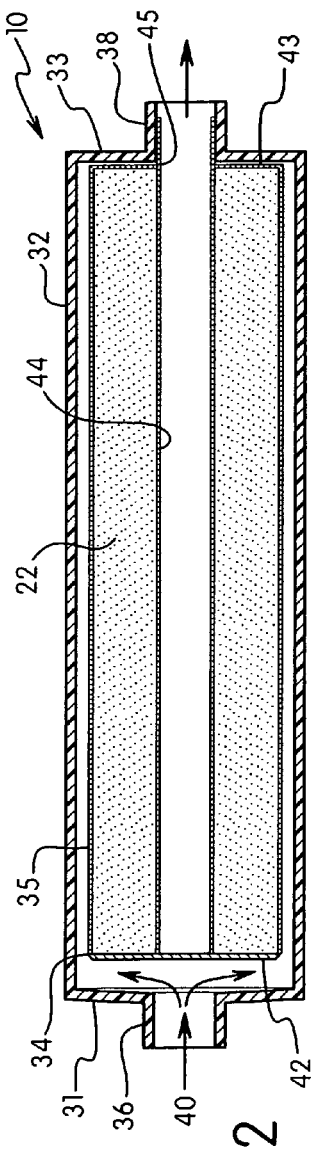

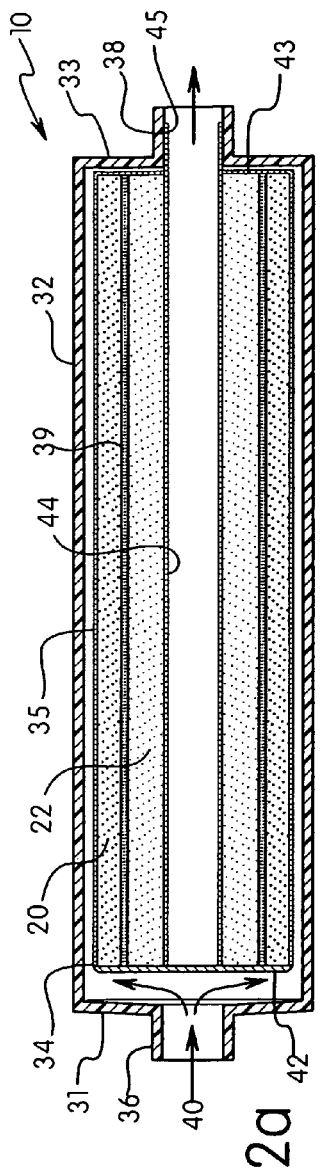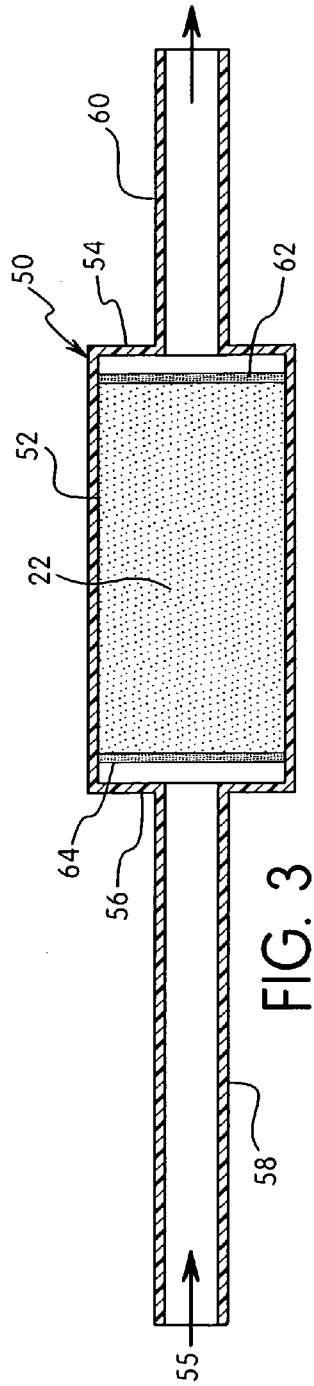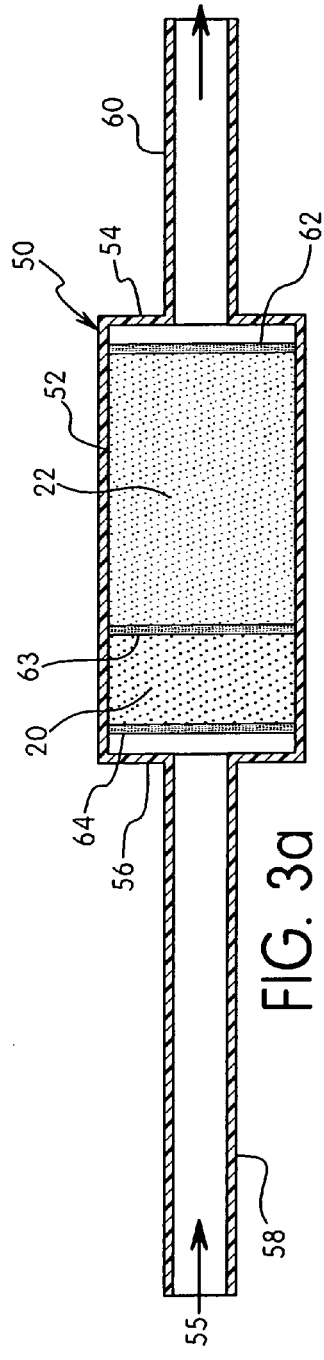

APPLIANCES FOR THE ALKALIZING OF WATER

This application is a continuation in part of provisional application 61/194,732 filed Sep. 30, 2008, the contents of which are incorporated herein by reference.

BACKGROUND OF THE INVENTION

This invention relates to appliances for the alkalizing of water. More particularly, the invention relates to point of use appliances for the alkalizing of water for subsequent personal use.

It has been found to be a positive for a person's health to ingest water that has an alkaline pH. Although the human stomach has an acidic pH of about 4.5 to 5.5, the blood of humans has a pH of about 7.4. This blood cell pH of 7.4 is supported by the bicarbonates produced in the body as a part of the digestive process. Foods are broken down by the hydrochloric acid generated in the stomach and in the lower intestine. This pH is about 4. As the hydrochloric acid is produced the bicarbonate is produced. The formation of bicarbonate is absorbed into the blood cell where it maintains the cell pH at about 7.4. As we age, this process slows down, and the resultant blood cell pH begins to lower. The ingestion of a high pH diet and/or liquid will cause the pH in the stomach to rise. The body compensates for the hydrochloric acid decrease by causing the stomach and the lower intestine to produce more hydrochloric acid and resulting bicarbonate. This additionally produced hydrochloric acid re-establishes the proper amount of hydrochloric acid needed for digestion, and the additional bicarbonate helps to maintain the blood cell required pH of 7.4. The pH of drinking water is normally about 7. The process of food digestion utilizes hydrochloric acid, and depending on the food being digested, other acids such as sulfuric acid and uric acid are produced in the stomach. As these acids are produced, an equal amount of bicarbonates is also produced. These should be significantly neutralized. Then, in order to maintain the blood pH at about 7.4, basic substances are needed. If not available from ingested substances, the body will take calcium and potassium ions from parts of the body such as the skeletal structure. Rather than to have this occur, it is preferable to supply basic ions through foods and supplements. The ingestion of a basic pH water will provide such ions. It also will throughout a day provide the basic ions needed to assist in maintaining the blood pH at about 7.4.

An alkaline pH water can be provided by the addition of an alkaline supplement to the water that is to be ingested as is set forth in U.S. Pat. No. 5,306,511 and to an alkaline pill that can be ingested as is set forth in U.S. Pat. No. 5,914,130. In U.S. Pat. No. 5,306,511 that relates to the product AlkaLife, there is disclosed a concentrated alkaline solution of sodium hydroxide and potassium hydroxide. A sufficient amount is added to a glass of water to raise the pH of the water to be ingested to between 8 and 12. This will neutralize the stomach acids and promote a healthy pH to the blood. U.S. Pat. No. 5,914,130 is directed to a pill comprised of sodium bicarbonate and potassium bicarbonate that is ingested to neutralize stomach acids. This is a non-caustic formulation. One pill a day will replace the ingestion of many glasses of water provided under U.S. Pat. No. 5,306,511. Another way to provide for the ingestion of an alkaline water is to produce such water through electrolysis. The water is separated into an alkaline stream and an acid stream. The alkaline stream can be collected and used or stored for later use. Such a process is disclosed in U.S. Pat. No. 6,572,902.

These are all interesting developments in the area of providing an alkaline water or related beverage or an alkalizing pill to be taken daily. All are directed to reducing body acidity. They demonstrate the need for adjusting and maintaining the body pH at a healthy level. However, none is directed to the quick and efficient generation of an alkaline water for ready ingestion. AlkaLife requires the person to carry a bottle with the concentrated alkaline solution and via an eyedropper add some to the water to be ingested. The pill AlkaMin needs to be taken daily and will have a varying effect in the body as the day progresses. An electrolysis source of alkaline water will require a person to carry a supply of the alkaline water around through the day. This can be heavy and bulky.

The present invention provides a solution to this problem. There is provided a point of use supply of an alkaline water. This is through the use of a formulation that will supply alkaline base ions to water that is flowed through the formulation. This is a solid, substantially non-water soluble formulation that will supply one or more of sodium, potassium, calcium and magnesium ions to water that flows through the formulation. The formulation will be a part of an appliance such as a carafe filter, a straw, a water bottle unit that can alkalize and optionally purify a water at the time of ingestion, and a unit that is adjacent to a water source such as a counter top or under the sink unit for water treatment in a home, office school or business. All of these units will provide an alkalized water on demand by the treatment of the water with solid, substantially insoluble, formulation.

BRIEF DESCRIPTION OF THE INVENTION

The invention is directed to a unit for treating input water to increase the alkalinity of the input water, the unit comprising a housing, an input aperture for input water and an exit aperture for the flow of the input water from the housing for ingestion, a holder for an alkaline formulation mounted in the housing, one end of the housing connected to the input aperture and the other end of the holder connected to an exit aperture of the housing, the alkaline formulation being a solid and comprising at least one shaped structure containing compounds to raise the pH of the input water, the alkaline formulation containing ions of one or more of sodium, potassium, calcium and magnesium, the pH of the input water being increased at least about 0.5 pH.

The alkaline formulation can contain about 25% to about 80% by weight of the ions of one or more of sodium, potassium, calcium and magnesium. The alkaline formulation can have a calcium content of about 40% to 60% by weight of calcium ions in the form of their oxides and about 8% to about 20% by weight of magnesium ions in the form of their oxides The alkaline formulation can be in the form of particles having a mean diameter of about 5 mm to about 50 mm or can be in a non-particulate three dimensional form. The input water has a pH of about 5 to 7.5, usually about 7. The alkaline formulation can treat a total volume of water of about 5 liters to about 10,000 liters depending on the appliance unit and the alkaline formulation content of the appliance unit. In a preferred embodiment the holder and formulation are replaceable. The full appliance unit need not be replaced.

The appliance unit can be a straw, the straw having a housing, a dip tube extending from the lower input end of the housing, and a straw segment extending from the exit end of the housing whereby, when a suction is applied to the straw segment, water is drawn up through the dip tube into and through the housing and alkaline formulation exiting into the straw segment. The appliance unit also can be a water bottle with a modified straw unit containing the alkaline formulation. By squeezing the bottle or through a sucking action on the bottle exit, the water is drawn up through the modified straw and ingested.

The appliance unit can be a pour-through unit such as a carafe attachment wherein the housing is an input funnel at the housing input end and disposed over a container at the housing output end whereby input water is fed into the funnel, passed downwardly through the housing, and flowed through the holder containing the formulation and into the container from the exit aperture of the housing.

The housing in one embodiment is a continuous longitudinal body except for the input aperture and the exit aperture with the water flowed longitudinally through the housing and the container alkaline formulation from the input aperture to the exit aperture. In an alternative embodiment, the holder is a longitudinal body with an exit aperture at one end and a plurality of small to micro apertures in the longitudinal body surface to allow water to be alkalized to flow radially into a holder for the alkaline formulation in the housing, through the alkaline formulation and into a collector channel in the holder. The various appliances can utilize a longitudinal flow or a radial flow.

The holder in a further embodiment can contain a water purification formulation prior to the alkaline formulation. The holder, purification formulation, and alkaline formulation are replaceable in the housing of the appliance.

In the embodiment where the unit is a straw, the housing will contain the purification formulation and the alkaline formulation whereby, when a suction is applied to the straw, water is drawn up through the dip tube into and through the holder and purification formulation and alkaline formulation exiting into the straw segment.

In the embodiment where the appliance unit is a carafe, the housing is a funnel-like housing disposed over a container at the housing output end whereby input water is fed into the funnel, passed downwardly through the housing alkaline formulation and/or purification formulation in the housing, and flowed into the container from the exit aperture of the housing.

In the embodiment where the housing is a continuous elongated body except for the input aperture and the exit aperture, the purification formulation and the alkaline treatment formulation are layered longitudinally, the purification formulation layer being prior to the alkaline treatment formulation.

In the embodiment where the housing has a holder for the purification formulation and the alkaline formulation, the holder is an elongated structure with an outer wall and an internal channel, the channel closed adjacent the input aperture of the housing, and at least a portion of the outer wall having a plurality of pores to allow for the passage of water radially into the holder and into contact with the purification formulation and/or alkaline formulation, and then into the internal channel to raise the pH of the water exiting the internal channel at the exit aperture of the housing.

The formulation is a solid that is substantially non-water soluble but which contains one or more sources of sodium, potassium, calcium and/or magnesium ions that can be dissolved into the water flowing through the alkaline formulation. The support for such ions is an alumina, aluminosilicate inclusive of zeolites, silica, titania, or a clay. The support will have a particle density of about 0.9 to about 1.3 g/cc. The formulation may contain particulate magnesium metal.

BRIEF DESCRIPTION OF THE DRAWINGS

FIG. 1 is a cross-sectional view of an appliance unit housing containing a purification formulation and an alkalizing formulation in a longitudinal arrangement.

FIG. 1a is a cross-sectional view of a holder cartridge that can be used in conjunction with the appliance unit of FIG. 1.

FIG. 2 is a cross-sectional view of an appliance unit and a holder containing an alkalizing formulation a radial arrangement.

FIG. 2a is a cross-sectional view of an appliance unit and a holder containing a purification formulation and an alkalizing formulation a radial arrangement.

FIG. 3 is a cross-sectional view of a straw comprised of a combined housing and holder containing an alkalizing formulation in a longitudinal arrangement.

FIG. 3a is a cross-sectional view of a straw comprised of a combined housing and holder containing a purification formulation and an alkalizing formulation in a longitudinal arrangement.

DETAILED DESCRIPTION OF THE INVENTION

Figure 5:
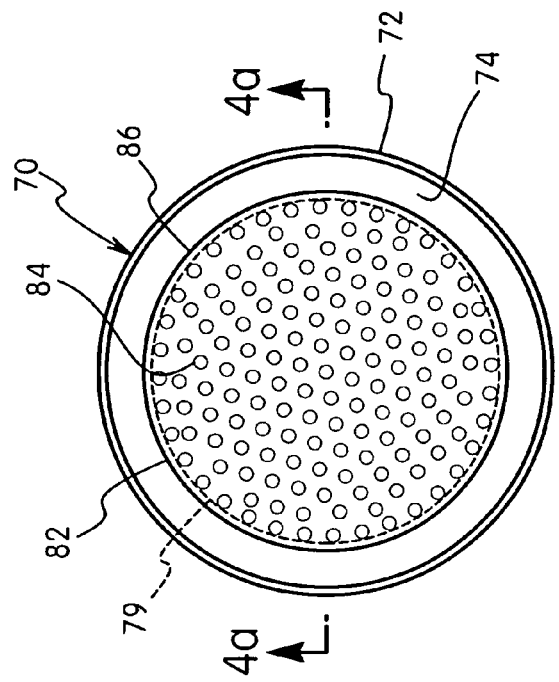
FIG. 5 is a top plan view of the carafe unit of FIG. 5.

The invention will now be described in more detail in its preferred embodiments with reference to the drawings. The described invention may be modified in various details but will still be within the concepts of the present invention.

It is known that alkaline water has certain health benefits. In the present invention it has been found that the best way to provide alkalized water for human ingestion is to alkalize the water at the point and the time of use. It is not useful to alkalize all of the water for a household since in some uses about a neutral pH is needed or in some instances an acidic pH is needed. For instance, the surface of the skin has a slightly acidic pH with a neutral to a slightly acidic water being useful. Further, if the water for a household is alkalized, there can result scale problems in the piping and in the water heaters. This will be a negative. The most effective and efficient technique to provide an alkalized water is to alkalize the water at or adjacent to the point of use. Consequently, the present invention is directed to having the alkalizing formulation a part of appliances such as water bottles, straws, carafes, counter top units that supply water only for ingestion, water fountains, soda fountains, refrigerator ice making units, and other point of use appliance units.

FIG. 1 sets out an appliance unit 10 that is adapted for linear flow of water that is to be alkalized in a longitudinal direction. The appliance unit 10 is comprised of continuous circumferential wall 12 with inlet end wall 11 and outlet end wall 13 which comprise the housing. In this embodiment the housing of the appliance unit substantially functions also as a holder for the purification formulation 20 and alkalizing formulation 22. In an additional embodiment the housing can solely contain the alkalizing formulation. Thus it will, along with mesh 23 and mesh 25, hold the alkalizing formulation 22 and the purification formulation 20. Appliance unit end wall 11 has inlet 16 for the flow of water 15 into the appliance unit 10, and appliance unit end wall 13 has outlet 18 for the flow of purified and alkalized water to use from the appliance unit 10. There is a porous pad 26 adjacent the inlet 16 to maintain the purification formulation 20 in place and a porous pad 21 adjacent the outlet 18. The mesh 23 such as a screen supports porous pad 26 and the mesh 25 supports pad 21. There can be a porous pad 28 separating the purification formulation from the alkalizing formulation. Although it is preferred to have porous pad 28, this pad can be deleted if the purification formulation and the alkalizing formulation will remain substantially segregated without this separating pad 28. This appliance unit is used in different point of use. It can be used in counter top water treatment units, water fountains, soda fountains, and other appliance units for the production of purified and alkalized water. If only alkalized water is to be produced the purification formulation 20 can be deleted. It then will only contain the alkalizing formulation.

FIG. 1*a* is directed to a cartridge holder unit 14 that can be used as a refill unit for the housing of the appliance unit 10. It comprises a circumferential outer wall 27, and pads 26, 28 and 21 as discussed above with reference to FIG. 1. Meshes 23 and 25 as shown in FIG. 1 will be a removable part of the appliance unit 10 and can provide a circumferential water seal in the FIG. 1 and FIG. 1*a* embodiments. In this way water will not be able to bypass the alkalizing formulation 22 and purification formulation 20 in FIG. 1*a*.

FIG. 2 is an appliance unit and housing unit that is related to that of FIG. 1 with the main difference being that in FIG. 2 the water flow through the holder 34 and the purification formulation 20 and/or alkalizing formulation 22 will be radial rather than longitudinal as shown in FIG. 1. In FIG. 2 the appliance unit 10 has a housing comprised of a circumferential wall 32 with end walls 31 and 33. End wall 31 has inlet aperture 36 for the input of water 40 into the housing and end wall 33 and alkalized water outlet 38. Within the appliance unit 10 is holder 34 with circumferential wall 35. There are end walls 42 and 43. The circumferential wall 35 is porous with apertures of from about 5 mm to about 40 mm. The apertures have a diameter less than the mean diameter of the particulate alkalizing formulation. The end walls 42 and 43 are solid, non-porous walls. Within the holder 34 is substantially porous channel 44 with apertures of from about 5 mm to about 40 mm. Part 45 of the porous channel 44 that is exposed to the input water is not porous but is continuous. These apertures have a diameter less than the mean diameter of the particulate alkalizing formulation. Optionally, there can be a pad around porous channel 44. In this embodiment, the input water flows into the appliance unit 10 through inlet 36 and is maintained between housing circumferential wall 32 and holder circumferential wall 35 until it flows through the apertures in holder circumferential wall 35 and into and through alkalizing media 22. After flowing through alkalizing media 22, the now alkalized water flows into porous channel 40 and to the exit at 38. This unit also can be used in counter top water treatment units, water fountains, soda fountains, and other appliance units for the production of purified and alkalized water.

FIG. 2*a* is directed to an appliance unit 10 and a holder 34 that can be used for the dual purpose of water purification and water alkalizing. In this embodiment, the water purification formulation layer will be adjacent to the holder circumferential wall 35 with an inner layer of the alkalizing formulation 22. There is an outer purification layer 20 with a separating porous pad 39 between the two formulations if needed. The other parts are the same as in FIG. 2 and have been described in the description of FIG. 2. The difference from FIG. 1 is the use of a purification formulation 20 in conjunction with 22. In either the FIG. 2 embodiment or the FIG. 2*a* embodiment, the holder 34 can be a replaceable cartridge. The water purification formulation can be a particulate material, a larger particle material, or a continuous molded insert. All that is required is that the input water flow first pass through the purification formulation and then through the alkalizing formulation. The particular needs will dictate the physical forms of the purification formulation and the alkalizing formulation.

FIG. 3 is a cross-sectional view of a straw appliance unit 50 for the alkalizing of water from a water bottle. A person can refill the bottle from a water tap, a fountain, or from a large spring water bottle, and have alkalized water by drinking the water via the straw appliance unit 50. The straw appliance 50 contains the alkalizing formulation 22. At the water input end of the alkalizing formulation there is a porous pad 64, and at the outlet end there is a porous pad 62. The function of the porous pads is to maintain the alkalizing formulation in place in the circumferential wall 52 of the straw appliance 50. The porous pads will have sufficient integrity so as to maintain their structure during use. The straw appliance unit 50, in addition to circumferential wall 52, has end wall 56 at the water input end and end wall 54 at the water exit end which collectively form the housing. Water 55 is supplied through straw dip tube 58 and by the applied suction of a person. It is drawn up through straw delivery tube 60 and into a person's mouth. The straw appliance unit 50 can be constructed to be disassembled so that replacement holder cartridges can be inserted and used as refills. In this way the housing, the dip tube, and the delivery tube can be reused. However, in most instances the full straw will be replaced when the alkalinity of the alkaline formulation has been depleted. The straw appliance parts are of a low cost, similar to that of a cartridge unit.

The FIG. 3*a* shows the straw appliance unit 50 with both a purification portion and an alkalizing portion. In this embodiment, there will be a purification formulation 20 adjacent to inlet end wall 56. This end wall 56 and porous pad 64 will maintain the purification media in position. As a part of this structure there will be a porous pad 62 adjacent end wall 56. In addition this straw appliance unit 50 can be adapted for use as a replacement unit for a personal water bottle of the type used by individuals in warm climates and by runners and other athletes. The housing is then designed to be mounted in the neck of the bottle with the dip tube 58 extending down into the bottle. In addition, although the straw appliance is shown with a longitudinal flow through the alkalinizing formulation, the flow can be radial. FIG. 2 and FIG. 2A show a radial flow.

Figure 4:
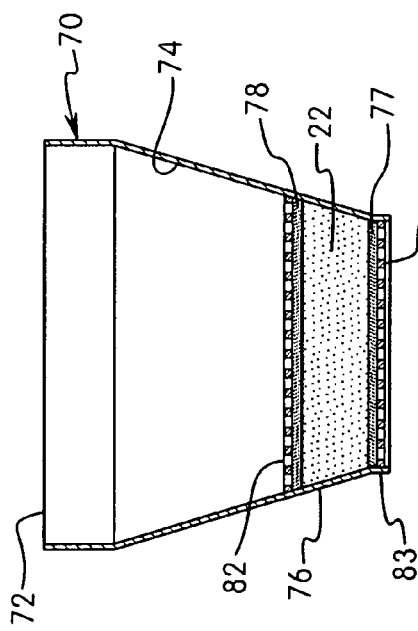
FIG. 4 is a cross-sectional view of a carafe unit that has a combined housing and holder containing an alkalizing formulation.
Figure 4A:
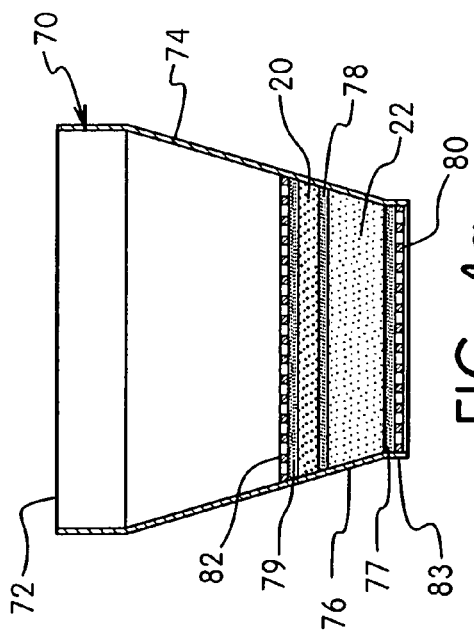
FIG. 4a is a cross-sectional view of a carafe unit along line 4a-4a of FIG. 5 that has a combined housing and holder containing a purification formulation and an alkalizing formulation.

FIG. 4 is a cross-section view of the upper portion of a carafe filter unit 70. The carafe filter unit 70 has upper wall 72 and tapered wall 74 to a base area 76 which collectively form the housing. The carafe unit is open at the upper end. At the base area 76 there is a screen 80, a porous pad 77 above the screen, and the alkalizing formulation 22 above the porous pad 77. Above the alkalizing formulation 22 there is a porous pad 78 and a mesh 82 for water to pass through after it enters into the carafe filter unit 70. FIG. 5 is a top plan view of carafe filter unit 70 of FIG. 4. This FIG. 5 shows the lower region 76 in more detail with the apertures 84 to allow the input water to pass into the tapered funnel part 74 of the carafe filter unit. The mesh 82 contacts the tapered wall 74 at 86. FIG. 4*a* is an embodiment of the carafe filter unit where there is a purification formulation and an alkalizing formulation. In this embodiment the structure is the same as that of FIG. 4 with the addition of a purification formulation 20 above the porous pad 78 with a porous pad 79 above the purification formulation 20. The mesh 82 is above the porous pad 79. In this embodiment for the carafe filter unit the water will be both purified and alkalized. The apertures will be from about 0.5 mm to about 40 mm in diameter. Commercially available screen material can be used. The pad will be of a structure to hold the alkalizing formulation in place but be sufficiently porous to allow the water to readily pass through to the alkalizing formulation. If desired, above the alkalizing formulation there can be a purification formulation. It can be of a particulate size or of a small pellet size. Also, depending on the form of the purification formulation, there can be a pad between the purification formulation and the alkalizing formulation. The various structural parts can be molded from various thermoplastics. Preferred thermoplastics are polyethylenes and polypropylenes.

The purification formulations that can be used in the present appliance units include the various activated carbons and other materials that will remove heavy metals and various organics from water. Very useful formulations are disclosed in U.S. Pat. No. 5,118,655. These can be in a particulate or molded three dimensional form. The useful alkalizing formulations are those that will supply alkaline ions such as sodium, potassium, calcium, and magnesium ions to water that passes through the formulation. The objective is to raise the pH of the water at least about 0.5 pH, and preferably above about 8.0. This must be accomplished relatively quickly as the water is passing through the alkalizing formulation. In this way it can effectively raise the pH of water to the desired level to make the various appliances practical in raising the pH of water that is to be ingested.

The alkalizing formulation will be comprised of a support for the sodium, potassium, calcium, and magnesium ions. These ions must be extractable, leachable and/or exchangeable from the support over a period of time to raise the pH of the water flowing through the alkalizing formulation. The support will be a material such as an alumina, aluminosilicates including zeolite aluminosilicates, a silica, a titania, and/or a clay. The sodium, potassium, calcium, and magnesium ions are held in the support physically and chemically. If the support will contain a zeolite, the sodium, potassium, calcium, and magnesium ions can be ion exchanged for other ions in the water. The requirement is that the sodium, potassium, calcium and magnesium ions must be leachable, extractable, and/or exchangeable from the support. In addition, they should leach a minor amount of aluminum and any higher atomic weight metals into the water. In general, the supports can contain from about 25% to about 80% by weight of the sodium, potassium, calcium, and magnesium ions as calculated as their oxides. The remaining content is the substantially inert base material. The alkalizing formulation need not contain all of these ions. However, it is preferred that it contain at least three of these ions. The preferred ions are those of calcium, magnesium, and potassium. The formulation usually will be in a particle size of about 5 mm to about 50 mm and a particle density of about 0.7 to about 1.7 gms/cc., preferably about 0.9 to about 1.25 gms/cc. However, other particle sizes can be used, and the alkalizing formulation can be in the form of molded units that can be inserted into a holder and adapted to a particular use.

This alkaline formulation also can contain magnesium metal in the form of particulate magnesium. The magnesium metal, when utilized, will be in a content of about 3% to about 30% by weight of the alkaline formulation. The particle size can be similar to that of the oxide base material for the calcium, potassium, sodium, and magnesium ions. The particle size can also be greater or less than that of the oxide base material. In addition, the magnesium can be in the form of various shaped particles including chips.

Although the base support material can be an alumina, silica, titania, a clay, or an aluminosilicate, the preferred base material is silica. This silica material is essentially inert. The particles will have a silica content by weight of about 20% to about 50%, preferably about 25% to about 40%. Alumina will be present in an amount of less than 2.5% and preferably less than about 1% by weight. The calcium content as calcium oxide is about 40% to about 60%, preferably about 45% to about 55%. The magnesium content as magnesium oxide is about 8% to about 20% and preferably about 10% to about 18%. The potassium content as potassium oxide is about 0.5% to about 2%. The content of other materials will individually be less that 2% by weight and preferably less than 1%.

EXAMPLE

The base alkalizing material sample has the following formulation as percents by weight as follows: a silica content of 33.97%, alumina content of 0.53%; iron oxide content of 0.56%; a titania content of 0.01%; a calcium content of 49.91%, a magnesium content 13.98%, and potassium content of 1.04%. Any other substances are in a content of less than 0.1%. This formulation is mixed with particulate magnesium metal. The alkalizing formulation will be comprised of about 80% of the base formulation and 20% by weight particulate magnesium metal as magnesium chips. The base alkalizing material is available from the Norpro Division of Saint-Gobain Norpro in Stow, Ohio. The magnesium metal is available from the Reade Manufacturing Company in Manchester, N.J.

A static test was conducted on the above formulation. A quantity of 50 ml of alkalizing material formulation along with 200 ml of water is placed into a cup. The initial pH of the water was 7.05. The pH was measured at intervals. The pH and the intervals are as follows: 1 min. 9.99 pH; 5 min. 10.08 pH; 10 min. 10.08 pH; 30 min. 10.09 pH; 60 min. 10.12 pH; 24 hours 9.65 pH; 96 hours 9.73 pH; 120 hours 9.74 pH. After this 120 test interval the water was decanted from the formulation and 200 ml of fresh water added. After 30 sec. the pH was 8.98, and after 60 sec. the pH was 9.57. The data show that the pH will be maintained above about 8 over a long period of time.

In a dynamic test, water at a pH of 7.0 was passed to through a media bed of 8 gms. at a flow rate of 3 ml/sec. After one minute the pH was 8.49. At a flow rate of 4 ml/sec, the pH was 8.30 after one minute. At a flow rate of 5 ml/sec. the pH was 7.89 after one minute. In this test, it is shown that the alkalizing formulation can maintain an alkaline output at increased rates of flow through the media.

This formulation can be effective for use in personal water bottles and other personal appliances. In order to use this formulation in other than personal appliances, larger amounts will be required. In the combination with a purification formulation, such purification formulations are available under the trademark AQUASPACE from Western Water International in Forestville, Md.

I claim:

1. A unit for treating input water to increase the alkalinity of the input water comprising a housing, an input aperture for the input of water to the housing and an exit aperture for the flow of the input water from the housing, an alkaline formulation within the housing, the alkaline formulation comprising (a) at least one shaped structure containing ions of one or more of sodium, potassium, calcium and magnesium on a solid oxide base to raise the pH of the input water, and (b) particulate magnesium metal in about 3% to about 30% by weight of the alkaline formulation, the pH of the input water being increased at least about 0.5 pH.

2. A unit for treating input water as in claim 1 wherein the alkaline formulation contains from about 25% to about 80% by weight of ions of one or more of sodium, potassium, calcium and magnesium in the form of their oxides.

3. A unit for treating input water as in claim 2 wherein the calcium content is about 40% to 60% by weight of calcium ions in the form of their oxides and about 8% to about 20% by weight of magnesium ions in the form of their oxides to increase the pH of the input water to greater than about 8.

4. A unit for the treatment of input water as in claim 1 wherein the alkaline formulation contains about 20% by weight particulate magnesium metal.

5. A unit for the treatment of input water as in claim 1 wherein the unit can treat a total volume of water of about 5 liters to about 10,000 liters.

6. A unit for the treatment of input water as in claim 5 wherein the alkaline formulation is within a replaceable holder in the housing.

7. A unit for the treatment of input water as in claim 1 wherein the unit is a straw, the straw having a housing, a dip tube extending from a lower input end of the housing and a straw segment extending from an exit end of the housing, whereby when a suction is applied to the straw segment water is drawn up through the dip tube into and through the housing and alkaline formulation exiting into the straw segment with an increased pH.

8. A unit for the treatment of input water as in claim 1 wherein the unit is a housing structure disposed over a container whereby input water is fed into the housing structure, passed downwardly through the housing structure and the alkaline formulation, and flowed into the container from the exit aperture of the housing structure at an increased pH.

9. A unit for the treatment of input water as in claim 1 wherein the housing has an elongated structure with a water input end and a water output end, the alkaline formulation having a first end adjacent the water input end and a second end adjacent the output end, the water passing longitudinally from the first end to the second end to raise the pH of the water.

10. A unit for the treatment of input water as in claim 1 wherein the housing has a holder for the alkalizing formulation, the holder being an elongated structure with an outer wall and an internal channel, the channel closed adjacent the input aperture of the housing, at least a portion of the outer wall having a plurality of pores to allow for the passage of water radially into the holder, into contact with the alkaline formulation and into the internal channel to raise the pH of the water exiting the internal channel and the exit aperture of the housing.

11. A unit for the treatment of input water as in claim 1 wherein the housing has two portions, the first portion contains a water purification formulation and the second portion contains the alkaline formulation, the water purification part containing an activated carbon adsorbent.

12. A unit for treating input water as in claim 11 wherein the alkaline formulation contains from about 25% to about 80% by weight of ions of one or more of sodium, potassium, calcium and magnesium is in the form of their oxides.

13. A unit for treating input water as in claim 12 wherein the calcium content is about 40% to 60% by weight of calcium ions in the form of their oxides and about 8% to about 20% by weight of magnesium ions in the form of their oxides to increase the pH of the input water to greater than about 8.

14. A unit for the treatment of input water as in claim 1 wherein the alkaline formulation contains 20% by weight of particulate magnesium metal.

15. A unit for the treatment of input water as in claim 11 wherein the alkaline formulation in the holder can treat a total volume of water of about 5 liters to about 10,000 liters.

16. A unit for the treatment of input water as in claim 15 wherein the purification formulation and alkaline formulation are in a replaceable holder in the housing.

17. A unit for the treatment of input water as in claim 11 wherein the unit is a straw, the straw having a housing, a dip tube extending from a lower input end of the housing and a straw segment extending from an exit end of the housing, whereby when a suction is applied to the straw segment water is drawn up through the dip tube into and through the housing and the purification formulation and alkaline formulation exiting from the straw segment at an increased pH.

18. A unit for the treatment of input water as in claim 11 wherein the unit is a housing structure disposed over a container whereby input water is fed into the housing structure, passed downwardly through the housing structure and the purification formulation and the alkaline formulation, and flowed into the container from the exit aperture of the housing structure at an increased pH.

19. A unit for the treatment of input water as in claim 11 wherein the housing has an elongated structure with a water input end and a water output end, the purification formulation adjacent the input end, the alkaline formulation adjacent the purification formulation, the exit from the alkaline formulation adjacent the output end, the water passing longitudinally from input end to the output end to raise the pH of the water.

20. A unit for the treatment of input water as in claim 11 wherein the housing has a holder for the purification formulation and the alkaline formulation, the holder being an elongated structure with an outer wall and an internal channel, the channel closed adjacent the input aperture of the housing, at least a portion of the outer wall having a plurality of pores to allow for the passage of water radially into the holder and into contact with the purification formulation and the alkaline formulation, and then into the internal channel to raise the pH of the water exiting the internal channel at the exit aperture of the housing.

* * * * *